A. B. HELFRICH.
SCRAPING DEVICE.
APPLICATION FILED OCT. 18, 1919.
1,409,949.
Patented Mar. 21, 1922.
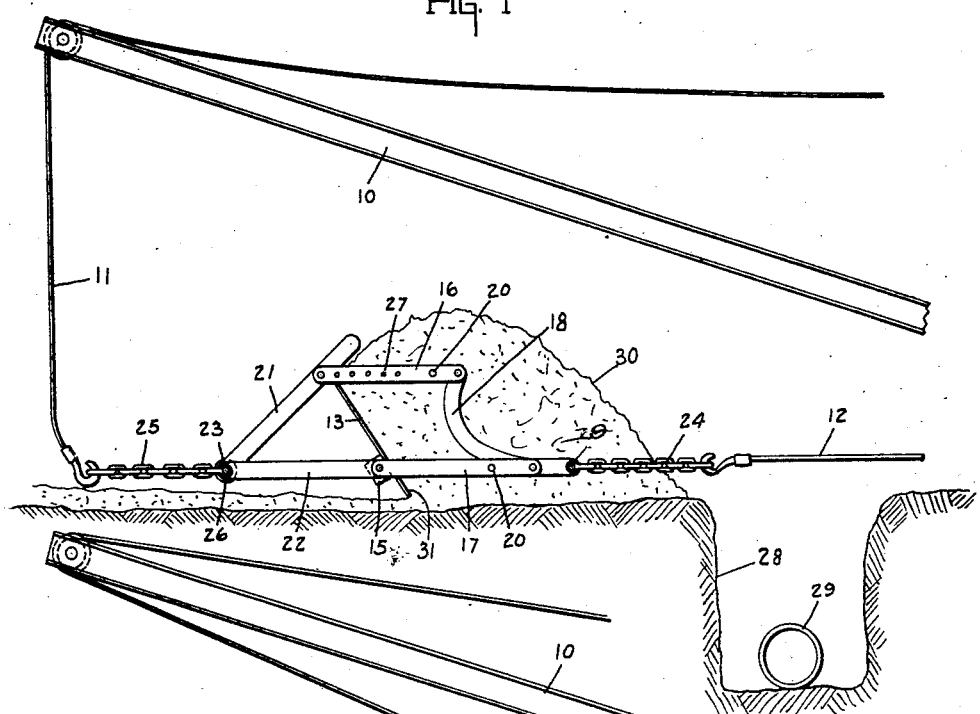
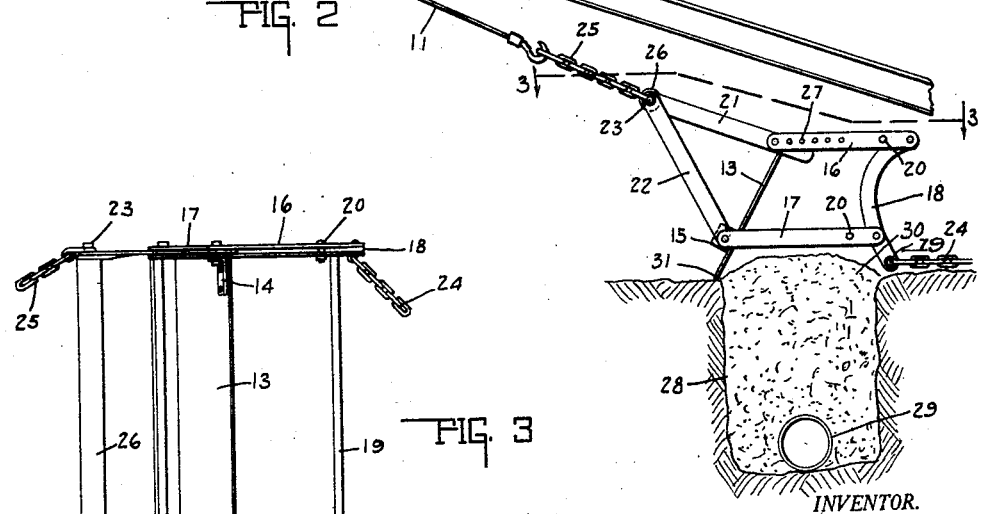
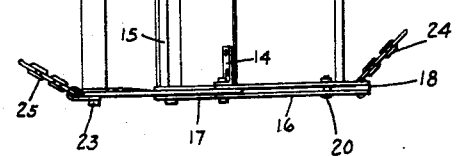
INVENTOR.
ALBERT B. HELFRICH.
BY
ATTORNEYS.

UNITED STATES PATENT OFFICE.

ALBERT B. HELFRICH, OF INDIANAPOLIS, INDIANA.

SCRAPING DEVICE.

1,409,949. Specification of Letters Patent. Patented Mar. 21, 1922.

Application filed October 18, 1919. Serial No. 331,625.

*To all whom it may concern:*

Be it known that I, ALBERT B. HELFRICH, a citizen of the United States, and a resident of Indianapolis, county of Marion, and State of Indiana, have invented a certain new and useful Scraping Device; and I do hereby declare that the following is a full, clear, and exact description thereof, reference being had to the accompanying drawings, in which like numerals refer to like parts.

This invention relates to a backfilling or trench filling machine and the like wherein the earth transferring device is self loading and self dumping, so that the engineer of the machine is the sole operator required, since heretofore in machines of this type an additional operator has been required to guide the earth transferring device and assist in the loading and unloading thereof.

Another object of the invention is to provide in a backfilling machine a scraper which can transfer all the remove earth back to the trench.

The full nature of the invention will be understood from the accompanying drawings and the following specification and claims.

In the drawings, Fig. 1 is a side elevation of the invention when used as a back filling device, the scraper being loaded. Fig. 2 is a similar view showing the parts in the unloading position. Fig. 3 is a plan view of the scraper taken on the line 3—3 of Fig. 2.

In the accompanying drawings 10 indicates a boom of a power unit with which the invention is used. The power unit is provided with two independent power cables 11 and 12, the former being attached to the rear of the improved scraper, and the latter to the front of the scraper for operating the same. In backfilling machines the machine moves parallel with the trench, and in prior devices an additional operator was required to guide the scraping device. Herein the cables 11 and 12 are attached to the device in such a manner that the operator of the backfilling machine also controls the operation of the scraping device.

The scraping device comprises a scraping plate or scoop 13, upon the rear side of which are secured two pairs of hinge forming angle plates providing pivotal connections for members hereinafter to be described. These mountings consist of an upper pair 14 and a lower pair 15. Upon each of the upper hinge plates 14 is pivotally mounted a bar link member 16, while upon each of the lower pair of hinge plates 15 is pivotally mounted the link members 17. The bar links 16 and 17 are connected by a curved bar link 18, one end of the link 16 being connected to one end of the link 18, while the link 17 is pivotally connected intermediate the ends of the link 18. The links 18 are connected by the rod 19. Projecting rearwardly from the scraping plate 13 and pivotally connected therewith are the pairs of bar links 21 and 22. The links 21 are pivotally mounted on the hinge plates 14, and the links 22 are pivotally mounted on the hinge plate 15, all the links 21 and 22 being connected by means of a rod 23, thereby forming a rigid triangular supporting framework for the scraping plate 13.

To the forward ends of the curved links 18 is secured a chain 24 to which the cable 12 is attached. To the rod 23 is secured a chain 25, to which the cable 11 is attached. Upon the rod 23 is mounted a weight member herein shown by the pipe 26. The links 16 are also shown as having an adjustable connection with the plate 13, for which purpose the holes 27 are provided. To the links 16 and 17 are secured pairs of stop pins 20. The upper pins 20 limit the forward movement of the links 16 by engaging the curved links 18, while the rearward movement of the links 18 is limited by the lower pins 20, see Figs. 2 and 1 respectively.

In Figs. 1 and 2 there is shown a trench 28, in the bottom of which has been laid a pipe or conduit 29. The earth from the trench, as herein shown, is at one side thereof. The opposite side of the trench supports the carriage and power portion of the back-filling machine with which the invention is used. Upon the application of power to the cable 12, the upper ends of links 18 are moved rearwardly towards the lower end of the plate 13 until the links 18 engage the lower pair of stops 20. Continued application of power to the cable 12 causes the plate 13 to engage the earth 30 and scrape the same towards the trench. When the lower edge 31 of the plate 13 reaches the edge of the trench the power is removed from the cable 12. Upon the application of power to the cable 11, the edge 31 of the plate 13 acts as a fulcrum and pivot, whereupon the upper portion of the plate and the links 18 are projected forwardly until the latter engage the upper pair of pins 20. In this manner the scraping plate throws into the trench the earth that is carried toward it. The cable 12 is then released, and the continued application of power to the cable 11 returns the scraper to its original position, as shown in Fig. 1, the parts however remaining as shown in Fig. 2. The application of power to the cable 12 will then cause the parts to resume the position shown in Fig. 1 and whereupon the backfilling may be continued.

As shown herein the links 16 are provided with additional holes 27 so that the plate 13 may be adjusted so that the angle of the slip is that of the kinds of earth to be moved. From the foregoing it will be apparent that but one operator is necessary to control the backfilling machine and handle the scraper, which is self loading and self dumping, in the manner described. Furthermore, as shown by the position of the edge 31 in Fig. 2, the scraper is adapted to entirely remove the earth from the street, since the edge 31 is adapted to enter a gutter and entirely removing the earth therefrom.

While I have hereinbefore described the preferred embodiment of my invention with some particularity, I recognize the fact that various changes may be made in the detailed construction and arrangement of the parts herein shown, therefore no undue limitation should be understood from the foregoing detailed description.

In the foregoing specifications and the following claims the term plate and plate means includes a scoop of any desired shape.

The invention claimed is:

1. In a self-loading and self-dumping scraping device, the combination of a plate, a pair of bars pivotally supported near the upper corners of the plate and at opposite sides thereof, a second pair of bar links similarly supported near the lower corners of said plate, another pair of bar links, each of said last mentioned links being adapted to pivotally support the other ends of the links upon the same side of the plate, and a pair of oppositely extending cables associated with the plate and the bar links for moving and tilting the plate for loading, transporting and unloading material to be handled thereby.

2. In a self-loading and self-dumping scraping device, the combination of a plate, a pair of bars pivotally supported near the upper corners of the plate and at opposite sides thereof, a second pair of bar links similarly supported near the lower corners of said plate, another pair of bar links, each of said last mentioned links being adapted to pivotally support the other ends of the links upon the same side of the plate, a pair of oppositely extending cables associated with the plate and the bar links for moving and tilting the plate for loading, transporting and unloading material to be handled thereby, and limit means associated with an upper bar link for limiting the unloading tilting movement of the plate means.

3. In a self-loading and self-dumping scraping device, the combination of a plate, a pair of bars pivotally supported near the upper corners of the plate and at opposite sides thereof, a second pair of bar links similarly supported near the lower corners of said plate, another pair of bar links, each of said last mentioned links being adapted to pivotally support the other ends of the links upon the same side of the plate, a pair of oppositely extending cables associated with the plate and the bar links for moving and tilting the plate for loading, transporting and unloading material to be handled thereby, and means associated with a lower bar link for limiting the tilted position of the plate means in the loading and transporting of the material.

4. In a self-loading and self-dumping scraping device, the combination of a plate, a pair of bars pivotally supported near the upper corners of the plate and at opposite sides thereof, a second pair of bar links similarly supported near the lower corners of said plate, another pair of bar links, each of said last mentioned links being adapted to pivotally support the other ends of the links upon the same side of the plate, a pair of oppositely extending cables associated with the plate and the bar links for moving and tilting the plate for loading, transporting and unloading material to be handled thereby, limit means associated with an upper bar link for limiting the unloading tilting movement of the plate means, and means associated with a lower bar link for limiting the tilted position of the plate means in the loading and transporting of the material.

5. In a self-loading and self-dumping device, the combination with an earth-removing plate means, a cable for moving said plate means in one direction, and a second cable for moving said plate means in the opposite direction, of articulated means interposed between said plate means and said first mentioned cable means which tilts said plate means into unloading position when said first mentioned cable means is held stationary and said second mentioned cable means is actuated.

6. In a self-loading and self-dumping device, the combination with an earth-removing plate means, a cable for moving said plate means in one direction, and a second cable for moving said plate means in the opposite direction, of means interposed between said plate means and said first mentioned cable for tiltably mounting the same, and a weight upon the opposite side of the plate means and adapted to maintain the plate means in the loading position.

7. In a self-loading and self-dumping device, the combination with an earth-removing plate means, a cable for moving said plate means in one direction, and a second cable for moving said plate means in the opposite direction, of means interposed between said plate means and said first mentioned cable for tiltably mounting the same, and a weight upon the opposite side of the plate means and adapted to tilt the plate means into loading position when the first mentioned cable is slackened and the second mentioned cable is actuated.

8. In a self-loading and self-dumping device, the combination with an earth-removing plate means, a cable for moving said plate means in one direction, and a second cable for moving said plate means in the opposite direction, of articulated means interposed between said plate means and said first mentioned cable means which tilts said plate means into unloading position when said first mentioned cable means is held stationary and said second mentioned cable means is actuated, and means for limiting the tilting movement of the plate means.

9. In a self-loading and self-dumping device, the combination with an earth-removing plate means, a cable for moving said plate means in one direction, and a second cable for moving said plate means in the opposite direction, of means interposed between said plate means and said first mentioned cable for tiltably mounting the same, a weight upon the opposite side of the plate means and adapted to tilt the plate means into loading position when the first mentioned cable is slackened and the second mentioned cable is actuated, and means for limiting the tilting movement of the plate means.

10. In a self-loading and self-dumping device, the combination with an earth-removing plate means, a cable for moving said plate means in one direction, and a second cable for moving said plate means in the opposite direction, of means interposed between said plate means and said first mentioned cable for tiltably mounting the same, a weight upon the opposite side of the plate means and adapted to tilt the plate means into loading position when the first mentioned cable is slackened and the second mentioned cable is actuated, and means for limiting the tilting movement of the plate means.

11. In a self-loading and self-dumping device, the combination with an earth-removing plate means, a cable for moving said plate means in one direction, and a second cable for moving said plate means in the opposite direction, of means interposed between said plate means and said first mentioned cable means for tilting said plate means into unloading position when said first mentioned cable means is held stationary and said second mentioned cable means is actuated, and a weight upon the opposite side of the plate means and adapted to tilt said plate from the unloaded position into the loading position when the first mentioned cable is released and the second mentioned cable is actuated, and being further adapted to maintain the plate means in the loading position during the loading and transporting movements of the plate means when the second mentioned cable is loosened and the first mentioned cable is actuated.

12. In a self-loading and self-dumping device, the combination with an earth-removing plate means, a cable for moving said plate means in one direction, and a second cable for moving said plate means in the opposite direction, of means interposed between said plate means and said first mentioned cable means for tilting said plate means into unloading position when said first mentioned cable means is held stationary and said second mentioned cable means is actuated, a weight upon the opposite side of the plate means and adapted to tilt said plate from the unloaded position into the loading position when the first mentioned cable is released and the second mentioned cable is actuated, and being further adapted to maintain the plate means in the loading position during the loading and transporting movements of the plate means when the second mentioned cable is loosened and the first mentioned cable is actuated, and means for limiting the unloading movement of the plate means.

13. In a self-loading and self-dumping device, the combination with an earth-removing plate means, a cable for moving said plate means in one direction, and a second cable for moving said plate means in the opposite direction, of means interposed between said plate means and said first mentioned cable means for tilting said plate means into unloading position when said first mentioned cable means is held stationary and said second mentioned cable means is actuated, a weight upon the opposite side of the plate means and adapted to tilt said plate from the unloaded position into the loading position when the first mentioned cable is released and the second mentioned cable is actuated, and being further adapted to maintain the plate means in the loading position during the loading and transporting movements of the plate means when the second mentioned cable is loosened and the first mentioned cable is actuated, and means for limiting the loading movement of the plate means.

14. In a self-loading and self-dumping device, the combination with an earth-removing plate means, a cable for moving said plate means in one direction, and a second cable for moving said plate means in the opposite direction, of means interposed between said plate means and said first mentioned cable means for tilting said plate means into unloading position when said first mentioned cable means is held stationary and said second mentioned cable means is actuated, a weight upon the opposite side of the plate means and adapted to tilt said plate from the unloaded position into the loading position when the first mentioned cable is released and the second mentioned cable is actuated, and being further adapted to maintain the plate means in the loading position during the loading and transporting movements of the plate means when the second mentioned cable is loosened and the first mentioned cable is actuated, means for limiting the unloading movement of the plate means, and means for limiting the loading movement of the plate means.

In witness whereof, I have hereunto affixed my signature.

ALBERT B. HELFRICH.